(12) United States Patent
Aybay

(10) Patent No.: US 8,724,628 B1
(45) Date of Patent: May 13, 2014

(54) METHODS AND APPARATUS FOR DESTINATION BASED HYBRID LOAD BALANCING WITHIN A SWITCH FABRIC

(75) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 418 days.

(21) Appl. No.: 12/953,149

(22) Filed: Nov. 23, 2010

(51) Int. Cl.
*H04L 12/28* (2006.01)

(52) U.S. Cl.
USPC .......................................... 370/392; 370/422

(58) Field of Classification Search
USPC .................. 370/230, 235, 237, 388, 389, 392
See application file for complete search history.

(56) References Cited

U.S. PATENT DOCUMENTS

| | | | |
|---|---|---|---|
| 7,027,404 B2 * | 4/2006 | Sreejith et al. ................ | 370/238 |
| 2009/0003212 A1 * | 1/2009 | Kwan et al. ................... | 370/235 |
| 2011/0063979 A1 * | 3/2011 | Matthews et al. ............. | 370/237 |

* cited by examiner

*Primary Examiner* — Pao Sinkantarakorn
*Assistant Examiner* — Kabir Jahangir
(74) *Attorney, Agent, or Firm* — Cooley LLP

(57) ABSTRACT

In some embodiments, an apparatus includes a switch module configured to receive an order identifier of a first data packet from a first stage of a multi-stage switch. The switch module is configured to receive an indicator of an available capacity of the first module of a second stage of the multi-stage switch fabric, and an indicator of an available capacity of a second module of the second stage of the multi-stage switch fabric. The switch module is configured, when the order identifier is assigned, to direct the first data packet to the first module of a second stage of the multi-stage switch fabric when the available capacity of the second module is lower than the available capacity of the first module. The switch module configured, when the order identifier is unassigned, to direct the first data packet to the second module when the available capacity of the second module is higher than the available capacity of the first module.

15 Claims, 8 Drawing Sheets

| Source ID 410 | Destination ID 412 | Payload 414 |

METHODS AND APPARATUS FOR DESTINATION BASED HYBRID LOAD BALANCING WITHIN A SWITCH FABRIC

BACKGROUND

Embodiments described herein relate generally to load balancing within a switch fabric including, for example, destination-based hybrid load balancing within multi-staged switch fabrics.

Transmission of data from a source device to a destination device via a physical link (e.g., an Ethernet link) can be, for example, disrupted because of congestion at a queue configured to receive the data. In some instances, the disruption can cause head-of-line (HOL) blocking and/or result in the loss of at least portions of the data due to buffer overflow. Some queues within the physical link can be congested, while other queues within the physical link are under utilized. Congestion can be caused by limitations in the destination device, such as, being configured to receive data in the order it is sent.

Thus, a need exists for methods and apparatus for directing data between a source and a destination to minimize congestion based on destination limitations.

SUMMARY

In some embodiments, an apparatus includes a switch module configured to receive an order identifier of a first data packet from a first stage of a multi-stage switch. The switch module is configured to receive an indicator of an available capacity of a first module of a second stage of the multi-stage switch fabric, and an indicator of an available capacity of a second module of the second stage of the multi-stage switch fabric. The switch module is configured, when the order identifier is assigned, to direct the first data packet to the first module of a second stage of the multi-stage switch fabric when the available capacity of the second module is lower than the available capacity of the first module. The switch module is configured, when the order identifier is unassigned, to direct the first data packet to the second module when the available capacity of the second module is higher than the available capacity of the first module.

DETAILED DESCRIPTION

Figure 1:
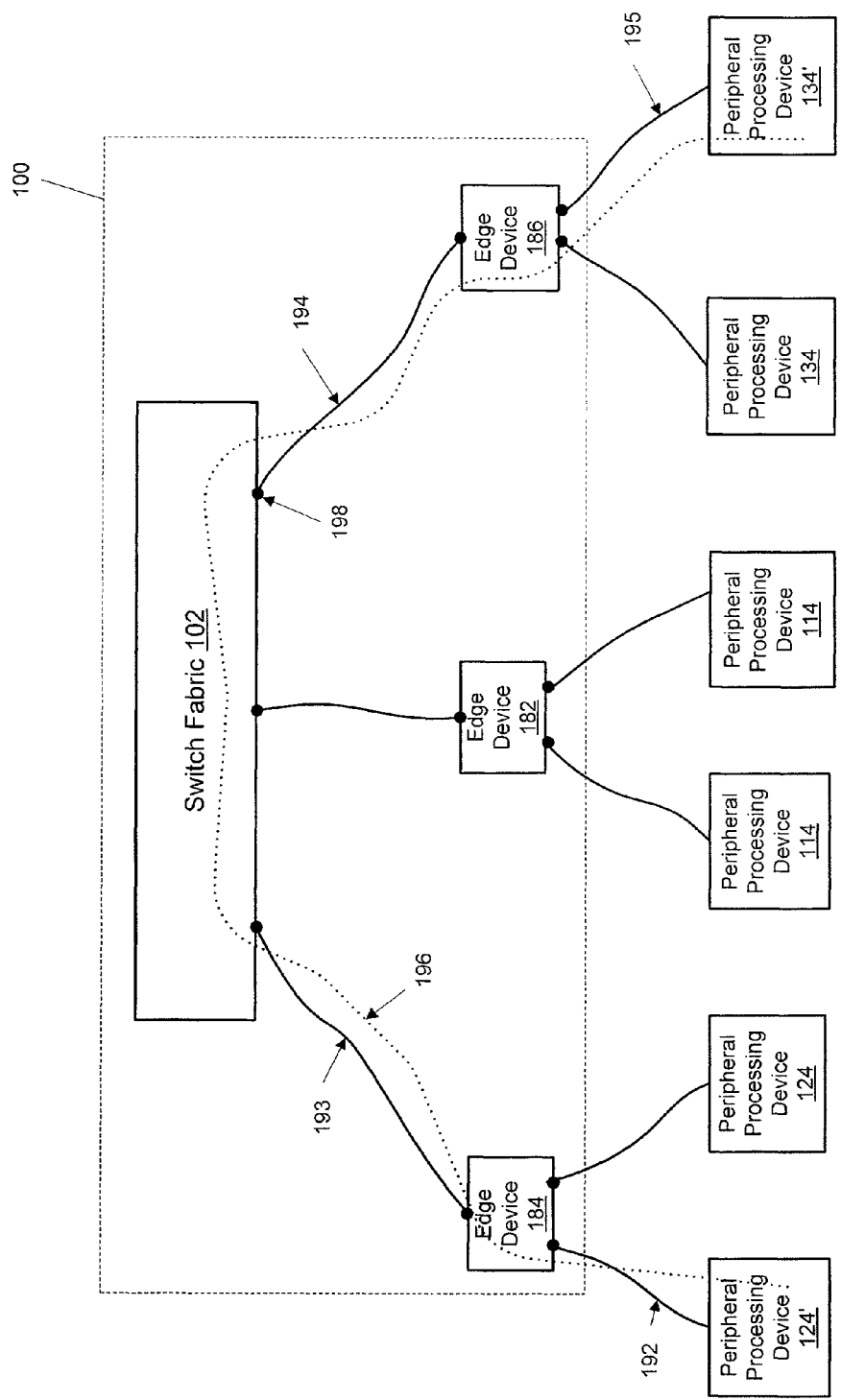
FIG. 1 is a system block diagram of a switch fabric system, according to an embodiment.

In some embodiments, an apparatus includes a switch module configured to receive an order identifier of a first data packet from a first stage of a multi-stage switch. The switch module is configured to receive an indicator of an available capacity of a first module of a second stage of the multi-stage switch fabric, and an indicator of an available capacity of a second module of the second stage of the multi-stage switch fabric. The switch module is configured, when the order identifier is assigned, to direct the first data packet to the first module of a second stage of the multi-stage switch fabric when the available capacity of the second module is lower than the available capacity of the first module. The switch module is configured, when the order identifier is unassigned, to direct the first data packet to the second module when the available capacity of the second module is higher than the available capacity of the first module.

In some embodiments, an apparatus includes a switch module configured to receive an destination identifier of a first data packet from a first stage of a multi-stage switch. The switch module is configured to send a request for an order identifier based on the destination identifier. The switch module is configured to request, when the order identifier is unassigned, an indicator of an available capacity of a first module of a second stage of the multi-stage switch fabric, and an indicator of an available capacity of a second module of the second stage of the multi-stage switch fabric. The switch module is configured to direct the first data packet to the first module when the available capacity of the first module is higher than the available capacity of the second module.

In some embodiments, a non-transitory processor-readable medium storing code represents instructions to cause a processor to receive an order identifier of a first data packet from a multi-stage switch. The non-transitory processor-readable medium storing code further represents instructions to cause a processor to direct, when the order identifier is unassigned, the first data packet to any module from multiple modules of a second stage of the multi-stage switch, and to direct, when the order identifier is assigned, the first data packet to a first module from the multiple modules of a second stage of the multi-stage switch.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route, or switch, ("route") a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used herein, a module that is within a switch fabric can be, for example, any assembly and/or set of operatively-coupled electrical components that define one or more switches within a stage of a switch fabric. In some embodiments, a module can include, for example, a memory, a processor, electrical traces, optical connectors, and/or the like.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). For example, FIG. 2 refers to specific stages within a given switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic diagram that illustrates a switch fabric system 100, according to an embodiment. The switch fabric system 100 includes a switch fabric 102 and multiple edge devices 182, 184, 186. The switch fabric system 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the edge devices 182, 184, 186 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 are configured to send data (e.g., data packets, data cells, etc.) to the switch fabric system 100 via the edge devices 182, 184, 186. In some embodiments, the connection between the peripheral processing devices 114, 124, 134 and the edge devices 182, 184, 186, respectively, is a direct link. Such a link can be said to be a single physical hop link. In other embodiments, the peripheral processing devices can be operatively coupled to the edge devices via intermediate modules. Such a connection can be said to be a multiple physical hop link.

Each edge device 182, 184, 186 can be any device configured to operatively couple peripheral processing devices 114, 124, 134 to the switch fabric 102. In some embodiments, for example, the edge devices 182, 184, 186 can be access switches, input/output modules, top-of-rack devices and/or the like. Structurally, the edge devices 182, 184, 186 can function as both source edge devices and destination edge devices. Accordingly, the edge devices 182, 184, 186 can send data (e.g., a data stream of data packets and/or data cells) to and receive data from the switch fabric 102, and to and from the connected peripheral processing devices 114, 124, 134.

In some embodiments, the edge devices 182, 184, 186 can be a combination of hardware modules and software modules (executing in hardware). In some embodiments, for example, each edge device 182, 184, 186 can include a field-programmable gate array (FPGA), an application specific integrated circuit (ASIC), a digital signal processor (DSP) and/or the like.

The edge devices 182, 184, 186 can be configured to prepare a data packet (e.g., an Ethernet packet) to enter the switch fabric 102. For example, the edge devices 182, 184, 186 can be configured to forward, classify, and/or modify the packet encapsulation (e.g., modify, add and/or remove a header portion, footer portion and/or any other identifier included within the data packet) of a data packet prior to sending the data packet to the switch fabric 102. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each of the edge devices 182, 184, 186 is configured to communicate with the other edge devices 182, 184, 186 via the switch fabric 102. Specifically, the switch fabric 102 is configured to provide any-to-any connectivity between the edge devices 182, 184, 186 at relatively low latency. For example, switch fabric 102 can be configured to transmit (e.g., convey) data between edge devices 182, 184, 186. In some embodiments, the switch fabric 102 can have at least hundreds or thousands of ports (e.g., egress ports and/or ingress ports) through which edge devices 182, 184, 186 can transmit and/or receive data.

The edge devices 182, 184, 186 can include one or more network interface devices (e.g., a 40 Gigabit (Gb) Ethernet interface, a 100 Gb Ethernet interface, etc.) through which the edge devices 182, 184, 186 can send signals to and/or receive signals from the switch fabric 102. The signals can be sent to and/or received from the switch fabric 102 via an electrical link, an optical link and/or a wireless link operatively coupled to the edge devices 182, 184, 186. In some embodiments, the edge devices 182, 184, 186 can be configured to send signals to and/or receive signals from the switch fabric 102 based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

The switch fabric 102 can be any suitable switch fabric that operatively couples the edge devices 182, 184, 186 to the other edge devices 182, 184, 186. In some embodiments, for example, the switch fabric 102 can be a Clos network (e.g., a non-blocking Clos network, a strict sense non-blocking Clos network, a Benes network) having multiple stages of switching modules (e.g., integrated Ethernet switches). In some embodiments, for example, the switch fabric 102 can be similar to the three-stage switch fabric 200 shown in FIG. 2 and described in further detail herein. In other embodiments, the switch fabric 102 shown in FIG. 1 can include any number of stages. In such embodiments, for example, the switch fabric 102 can include five, seven or nine stages.

In some embodiments, the switch fabric 102 can be (e.g., can function as) a single consolidated switch (e.g., a single large-scale consolidated L2/L3 switch). In other words, the switch fabric 102 can be configured to operate as a single logical entity (e.g., a single logical network element). Similarly stated, the switch fabric 102 can be part of a single logical hop between a first edge device 182, 184, 186 and a second edge device 182, 184, 186 (e.g., along with the data paths between the edge devices 182, 184, 186 and the switch fabric 102). The switch fabric 102 can be configured to connect (e.g., facilitate communication between) the peripheral processing devices 114, 124, 134. In some embodiments, the switch fabric 102 can be configured to communicate via interface devices (not shown) configured to transmit data at a rate of at least 10 Gb/s. In some embodiments, the switch fabric 102 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the switch fabric 102 can be logically centralized, the implementation of the switch fabric 102 can be highly distributed, for example, for reliability. For example, portions of the switch fabric 102 can be physically distributed across, for example, many chassis. In some embodiments, for example, a processing stage of the switch fabric 102 can be included in a first chassis and another processing stage of the switch fabric 102 can be included in a second chassis. Both of the processing stages can logically function as part of a single consolidated switch (e.g., within the same logical hop) but have a separate single physical hop between respective pairs of processing stages. More details related to architecture of the switch fabric 102 are described herein.

In use, a data packet (e.g., an Ethernet packet) can be sent between peripheral processing devices 114, 124, 134 via the switch fabric system 100. For example, a data packet can be sent from a first peripheral processing device 124' to a second peripheral processing device 134' via path 196. The first peripheral processing device 124' can send the data packet to the edge device 184 via link 192. The edge device 184 can then prepare the data packet to enter the switch fabric 102. Once prepared, the edge device 184 sends the data packet to the switch fabric 102 via link 193. The switching modules within the switch fabric 102 can route the data packets through the switch fabric 102. The data packet is sent through port 198 to the edge device 186 via link 194. The edge device 186 can then send the data packet to the second peripheral processing device 134' via link 195 using the first protocol.

Figure 2:
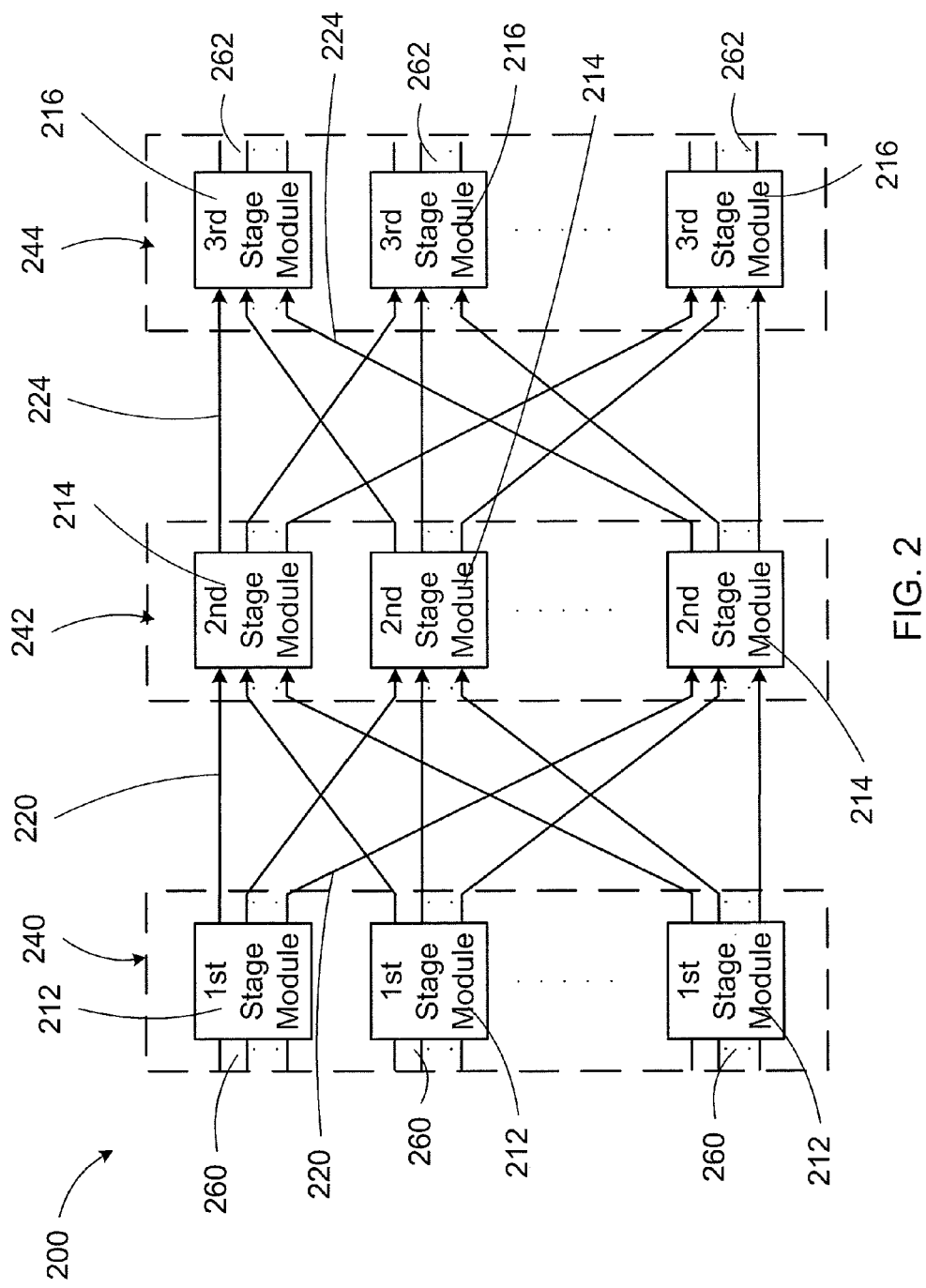
FIG. 2 is a schematic illustration of a switch fabric, according to another embodiment.

FIG. 2 is a schematic illustration of a switch fabric 200, according to an embodiment. The switch fabric 200 can include multiple physical hops that are within a single logical hop. Switch fabric 200 is a three-stage, non-blocking Clos network and includes a first stage 240, a second stage 242, and a third stage 244. The first stage 240 includes modules 212. Each module 212 of the first stage 240 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple input ports operatively coupled to write interfaces on a memory buffer (not shown in FIG. 2). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Each module 212 of the first stage 240 includes a set of input ports 260 configured to receive data (e.g., a signal, a cell of a packet, a data packet, etc.) as it enters the switch fabric 200. In this embodiment, each module 212 of the first stage 240 includes the same number of input ports 260.

Similar to the first stage 240, the second stage 242 of the switch fabric 200 includes modules 214. The modules 214 of the second stage 242 are structurally similar to the modules 212 of the first stage 240. Each module 214 of the second stage 242 is operatively coupled to each module 212 of the first stage 240 by a data path 220. Each data path 220 between a given module 212 of the first stage 240 and a given module 214 of the second stage 242 is configured to facilitate data transfer from the modules 212 of the first stage 240 to the modules 214 of the second stage 242.

The data paths 220 between the modules 212 of the first stage 240 and the modules 214 of the second stage 242 can be constructed in any manner configured to facilitate data transfer from the modules 212 of the first stage 240 to the modules 214 of the second stage 242. In some embodiments, for example, the data paths 220 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 200 is a non-blocking Clos network. Thus, the number of modules 214 of the second stage 242 of the switch fabric 200 varies based on the number of input ports 260 of each module 212 of the first stage 240. In a rearrangeably non-blocking Clos network (e.g., a Benes network), the number of modules 214 of the second stage 242 is greater than or equal to the number of input ports 260 of each module 212 of the first stage 240. Thus, if n is the number of input ports 260 of each module 212 of the first stage 240 and m is the number of modules 214 of the second stage 242, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 244 of the switch fabric 200 includes modules 216. The modules 216 of the third stage 244 are structurally similar to the modules 212 of the first stage 240. The number of modules 216 of the third stage 244 is typically equivalent to the number of modules 212 of the first stage 240. Each module 216 of the third stage 244 includes output ports 262 configured to allow data to exit the switch fabric 200. Each module 216 of the third stage 244 includes the same number of output ports 262. Further, the number of output ports 262 of each module 216 of the third stage 244 is typically equivalent to the number of input ports 260 of each module 212 of the first stage 240. Accordingly, in such embodiments, the number of input ports of the switch fabric 200 can be the same as the number of output ports of the switch fabric 200.

Each module 216 of the third stage 244 is connected to each module 214 of the second stage 242 by a data path 224. The data paths 224 between the modules 214 of the second stage 242 and the modules 216 of the third stage 244 are configured to facilitate data transfer from the modules 214 of the second stage 242 to the modules 216 of the third stage 244.

The data paths 224 between the modules 214 of the second stage 242 and the modules 216 of the third stage 244 can be constructed in any manner configured to facilitate data transfer from the modules 214 of the second stage 242 to the modules 216 of the third stage 244. In some embodiments, for example, the data paths 224 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

In some embodiments, the path a data packet follows through the switch fabric 200 can be determined based on a information stored in a look-up table, or based on a hash function or other function performed on the data packet ("look-up path"). In some embodiments, the look-up path can be determined by relevant module(s) 212, 214, 216. In these embodiments, the key used for the look-up path can be calculated by an edge device (e.g., edge device 184 in FIG. 1) during the forwarding and classification lookup. In this manner, module 212, 214, 216 does not have to parse the data packet to determine the destination of the data packet, which could be another edge device (e.g., edge device 186 in FIG. 1) or subsequent module (e.g., module 214 downstream from a module 212, or a module 216 downstream from a module 214). When the look-up path is determined, the look-up path can be independent of the available capacity of a buffer at the module 212, 214, 216. In some embodiments, the path a data packet follows through the switch fabric 200 can be determined based on, at least in part, the congestion (or load) of at least one module 212, 214 and/or 216 within the switch fabric 200 (e.g., when an available capacity of a buffer at the at least one module 212, 214 and/or 216 crosses a threshold) (also referred to herein as "load-based path"). A capacity module (not shown in FIG. 2) operatively coupled to the module 212, 214, 216 can send a capacity signal to one or more of the modules 212, 214, 216. More specifically, the modules 212, 214, 216 operatively coupled to the capacity module can monitor the capacity of the buffers of the modules 212, 214, 216.

Each module 212, 214, 216 can parse the data packet to determine which edge device and/or peripheral processing device is the destination device, i.e., the device to which the data packet is being sent. Destination devices can process data packet(s) from data that have been divided into more than one data packet. Destination devices can be categorized based on whether they are configured to receive in-order packet delivery (assigned path), prefer to receive in-order packet delivery (flexible path), or can accept out-of-order packet delivery (unassigned path). In some embodiments, an edge device can categorize a data packet based on the destination device prior to sending the data packet to a first stage module 212. In these embodiments, the edge device can parse the data packet, can categorize the destination device, and can append a destination category header to the data packet. In this manner, when the data packet is received by module 212, 214, 216, module 212, 214, 216 can parse the destination category header to determine the category of the destination device. In some embodiments, module 212, 214, 216 can parse a destination category header faster than module 212, 214, 216 can parse a data packet.

Assigned path destination devices process data packets in the order they are received. In this manner, when an assigned-path destination device receives data packets out-of-order, the destination device can process the data packets out-of-order and can result in corrupt data. Flexible-path destination devices can receive data packets in any order and can process the data packets in the correct order, but can operate more efficiently when they receive the data packets in the order they were sent. In this manner, when a flexible-path destination device receives data packets out-of-order, the destination device can process the data packets in the correct order, but can do so slower and/or with more errors, than if the destination device had received them in order. Unassigned-path destination devices can receive data packets in any order and can process the data packets in the correct order, and can operate with the similar efficiently when they receive the data packets in the order they were sent. In the manner, when an unassigned-path destination device receives data packets out-of-order, the destination device can process the data packets in the correct order, and can do so as fast and/or with similar or no errors, than if the destination device had received them in order.

Based on the available capacity information received from the capacity module, the module 212, 214, 216 can forward the data packet along an alternate path, different from the look-up path. In some embodiments, the alternate path can be chosen based on the available capacity, or load, of the buffer of the congested module 212, 214, 216. In some embodiments, the alternate path can be randomly chosen.

Figure 3:
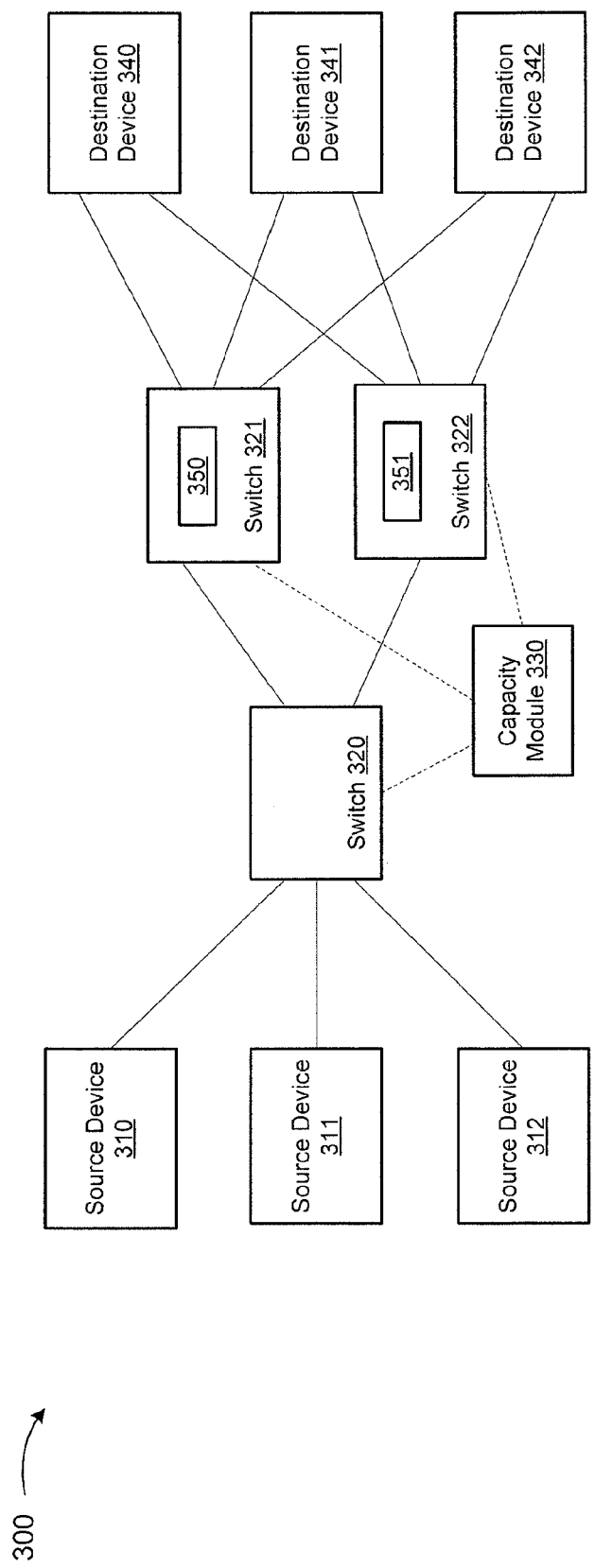
FIG. 3 is a schematic illustration of a portion of a switch fabric system, according to another embodiment.

FIG. 3 illustrates a portion of a switch fabric system 300. The illustrated portion of the switch fabric system 300 includes switches 320, 321, 322; a capacity module 330 operatively coupled to the switch 320; multiple source devices 310, 311, 312; and multiple destination devices 340, 341, 342. The source devices 310, 311, 312 and the destination devices 340, 341, 342 can be similar to the edge devices 182, 184, 186 and/or the peripheral processing devices 114, 124, 134 shown and described with respect to FIG. 1. As such, the source devices 310, 311, 312 are operatively coupled to the switch 320 and are configured to send data packets to the switch 320. Switch 320 is operatively coupled to switches 321 and 322, and configured to receive data packets from source devices 310, 311, 312, and configured to send data packets to switches 321 and 322. Switches 321 and 322 are configured to receive data packets from switch 320 and configured to send data packets to destination devices 340, 341 and 342. The destination devices 340, 341, 342 are configured to receive data packets from the switches 321 and 322, as described in further detail herein. In some embodiments, a capacity module such as capacity module 330 can be operatively coupled to source devices 310, 311, 312; destination devices 340, 341, 342; and/or switches 320, 321 and 322.

The switches 320, 321, 322 can be similar to the modules 212, 214, 216 of the switch fabric 200 collectively shown and described with respect to FIG. 2. As such, the switches 320, 321, 322 can be a portion of a switch fabric similar to the switch fabric 200. While not shown in FIG. 3, the switches 320, 321, 322 can also include one or more output ports operatively coupled to other switch modules and/or destination devices. As such, the switch 320 can send a data packet received from a source device 310, 311, 312 to switch 321, 322, and switch 321, 322 can send a data packet received from switch 320 to a destination device 340, 341, 342.

Figure 4:
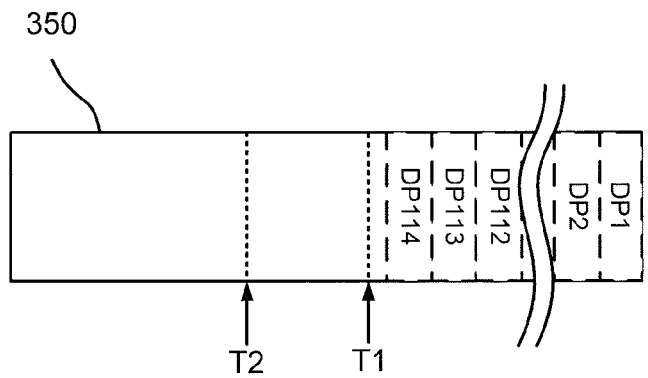
FIG. 4 is a schematic illustration of an output queue, according to another embodiment.

The switches 321, 322 also include output queues 350, 351 configured to buffer data packets received from the switch 320 prior to sending the data packets to destination devices 340, 341, 342. FIG. 4 illustrates the data packets stored within the output queue 350 in detail. As shown in FIG. 4, the output queue 350 can store data packets (e.g., DP1-DP114) waiting to be sent via an output port of the switch 321. The output queue 350 can be any suitable output queue. In some embodiments, for example, the output queue 350 operates as a first-in first-out (FIFO) buffer. In such embodiments, the data packets are sent via the output ports in the order received from the switch 320. In other embodiments, data packets can be assigned a priority level, with those data packets with a high priority level being moved to the front of the queue 350. In still other embodiments, queue 350 can be structured and/or divided into multiple priority-based queues. Output queue 351 can be similar to output queue 350.

The capacity module 330 is operatively coupled to the switches 320, 321, 322 and is configured to monitor an available capacity of the output queues 350, 351. In some embodiments, for example, periodically (e.g., every 0.1 seconds) the switch 321, 322 can send the capacity module 330 an indicator that represents an available capacity of the output queue 350, 351. In other embodiments, the capacity module 330 can periodically request such an indicator from the switch 321, 322. In some embodiments, switch 320 can communicate with capacity module 330 to monitor the available capacity of switch 321, 322 operatively coupled to capacity module 330. As described in further detail herein, based on the indicator of available capacity of the switch 321, 322 and based on the destination device, switch 320 can determine where to send the data packet.

The capacity module 330 can be any suitable hardware module and/or software module (executing in hardware) configured to monitor an available capacity of the output queue 350. In some embodiments, for example, the capacity module 330 can include a field-programmable gate array (FPGA), an application specific integrated circuit (ASIC), a digital signal processor (DSP) and/or the like.

Figure 5:
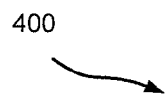
FIG. 5 is a schematic illustration of a data packet, according to another embodiment.

In use, the source devices 310, 311, 312 can send data packets to the switch 320. Such data packets can be similar to the data packet 400 shown in FIG. 5. As such, the data packet 400 can include a payload 414, a source identifier 410 and a destination identifier 412. The source identifier 410 can be an identifier of the source device 310, 311, 312 sending the data packet 400. For example, if source device 310 sends the data packet 400 to the switch 320, the source identifier 410 can be an identifier of source device 310. Similarly, the destination identifier 412 can be an identifier of the destination device 340, 341, 342 to which the packet is to be sent. In some embodiments, the source identifier 410 and/or the destination identifier 420 can be included within a header specific to a switch fabric (e.g. switches 320, 321, 322). In this manner, switches 320, 321, 322 can be simplified such that they do not need to parse or lookup standard L2 and/or L3 and/or L4 headers of data packets. In these embodiments, the total address space within the header can be smaller than the address space of a standard L2 header (e.g. 48 bits) and/or a standard L3 header (e.g. 32 or 64 bits). In other embodiments, the source identifier 410 and/or the destination identifier 412 can be an interne protocol (IP) address, a media access control (MAC) address, a Fiber Channel identifier (FCID) and/or any other suitable identifier. In other embodiments, the data packet 400 can include a destination category header (not shown in FIG. 4). The destination category header can categorize destination device 340, 341, 342 as assigned path, flexible path, or unassigned path. In these embodiments, the size of the destination category header can be smaller than the source identifier 410 and/or the destination identifier 412.

Using switch 321 as an example, as the switch 321 receives data packets from the switch 320, the switch 321 stores the data packets in the output queue 350. Similarly, as output ports become available, the switch 321 removes data packets from the output queue 350 and sends the data packets via the output ports. If the switch 321 receives data packets from the switch 320 at a rate greater than a rate at which it sends the data packets via the output ports, a larger number of data packets will be stored in the output queue 350 over time and the available capacity of the output queue 350 will decrease. In some instances, the available capacity can be above a first threshold T1. When the available threshold is above T1, data packets being sent to assigned-path destinations and flexible-path destinations can be routed through switch 321 along a look-up path, and data packets being sent to unassigned-path destinations can be routed around switch 320 (e.g., sent from a source device 310, 311, 312 to a switch(es) or switch fabric module(s) different from switch 321 and then to a destination device 340, 341, 342, in this example, switch 322). In some instances, the available capacity can be below T1. When the available capacity is below T1, data packets being sent to assigned-path destinations can be routed through switch 321 along a look-up path, and data packets being sent to unassigned-path destinations and flexible-path destinations can be routed around switch 321.

Figure 6:
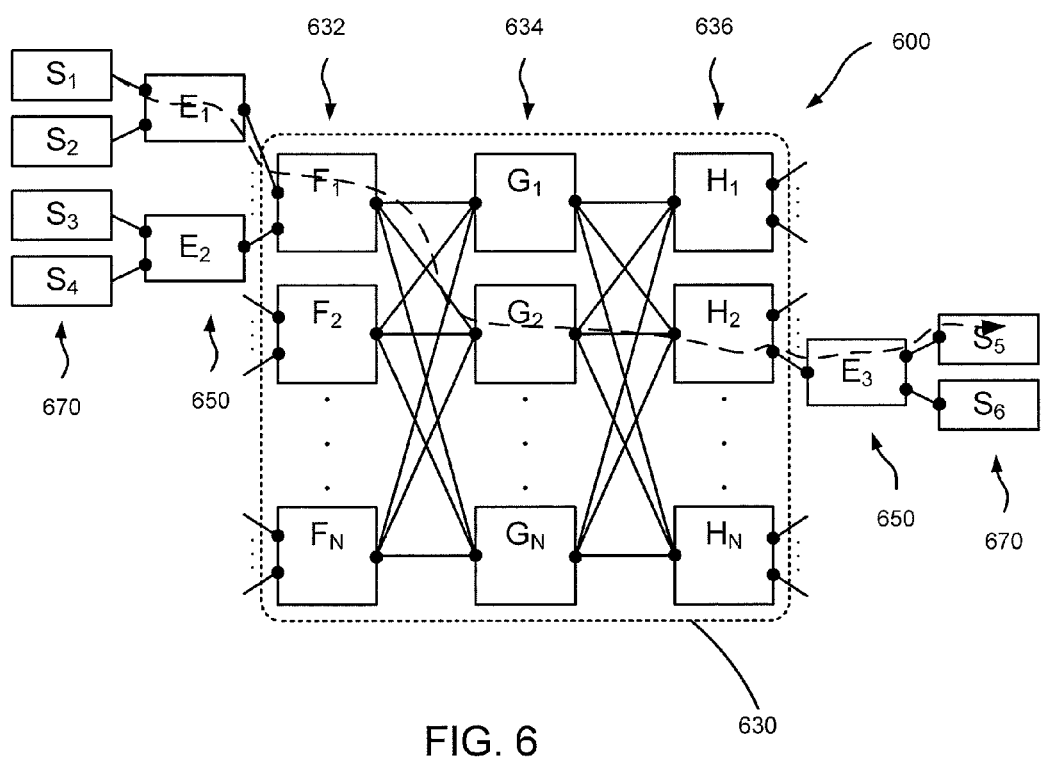
FIG. 6 is a system block diagram of a portion of a switch fabric system, according to another embodiment.

FIG. 6 is a schematic illustration of a switch fabric system 600, according to another embodiment. The switch fabric system 600 includes a switch fabric 630, multiple edge devices 650 operatively coupled to the switch fabric 630, and multiple peripheral processing devices 670 operatively coupled to the edge devices 650. Although not shown in FIG. 6, a capacity module is coupled to each module of the switch fabric 630. As described in further detail herein, a first peripheral processing device 670 (e.g., $S_1$) is configured to send a data packet to a second peripheral processing device 670 (e.g., $S_5$) via a first edge device 650 (e.g., $E_1$), the switch fabric 630, and a second edge device 650 (e.g., $E_3$).

The switch fabric 630 can be structurally and functionally similar to the switch fabric 200 (shown and described with respect to FIG. 2). Accordingly, the switch fabric includes modules $F_1$-$F_N$ associated with a first stage 632 of the switch fabric 630, modules $G_1$-$G_N$ associated with a second stage 634 of the switch fabric 630, and modules $H_1$-$H_N$ associated with a third stage 636 of the switch fabric 630. Each module $F_1$-$F_N$ associated with the first stage 632 is operatively coupled to each module $G_1$-$G_N$ associated with the second stage 634 via data paths. Similarly, each module $G_1$-$G_N$ associated with the second stage 634 is operatively coupled to each module $H_1$-$H_N$ associated with the third stage 636. The data paths between the modules $F_1$-$F_N$ associated with the first stage 632 and the modules $G_1$-$G_N$ associated with the second stage 634 and/or the data paths between the modules $G_1$-$G_N$ associated with the second stage 634 and the modules $H_1$-$H_N$ associated with the third stage 636 can be constructed in any manner configured to facilitate data transfer. In some embodiments, for example, the data paths include optical connectors, optical fibers and/or electrical connectors between the modules. In some embodiments, the data paths are within a midplane or a backplane.

Figure 7:
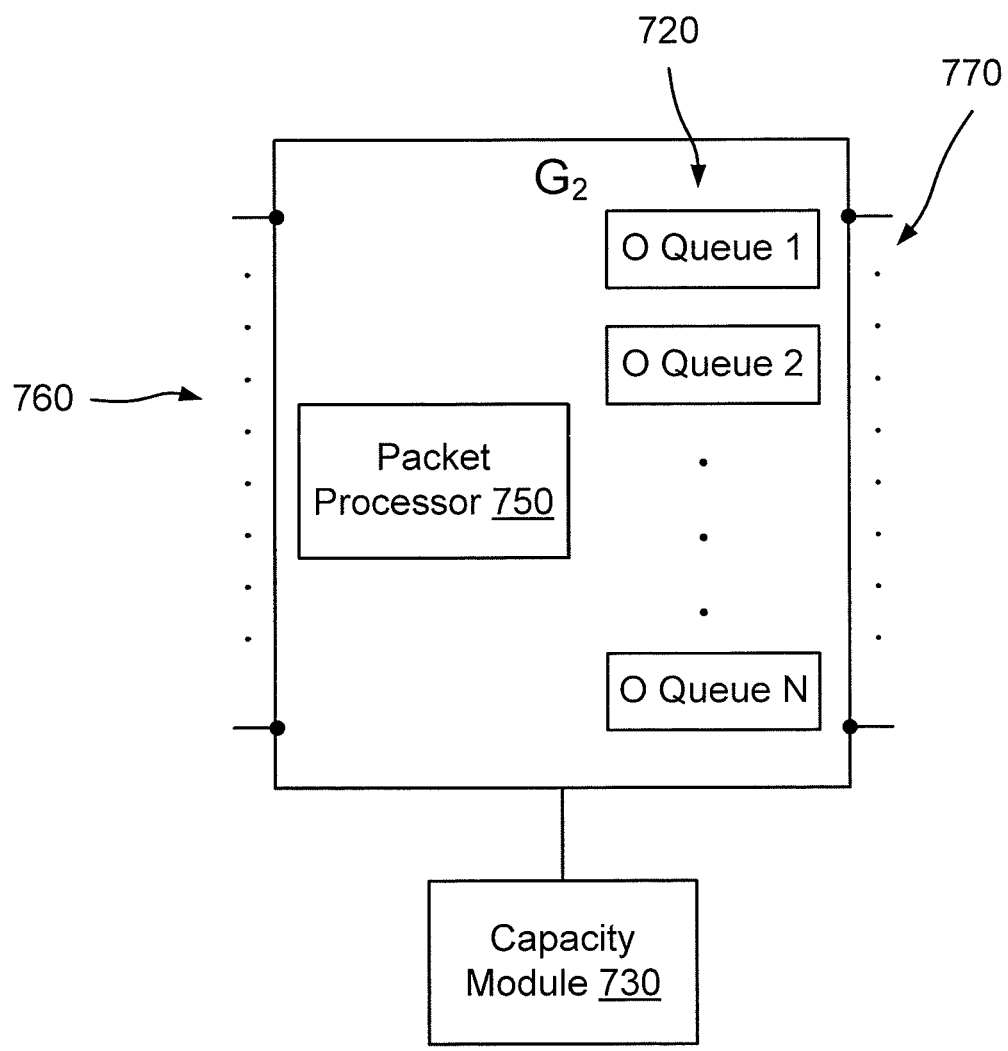
FIG. 7 is a schematic illustration of a module within a switch fabric, according to another embodiment.

FIG. 7 illustrates a module $G_2$ within the switch fabric 630. While the illustrated module $G_2$ is associated with the second stage 634 of the switch fabric 630 (see e.g., FIG. 6), the modules associated with the first stage 632 and the modules associated with the third stage 636 can be structurally and functionally similar to the module $G_2$ shown in FIG. 8. The module $G_2$ includes multiple input ports 760, multiple output ports 770, multiple output queues 720 and a packet processor 750. Additionally, a capacity module 730 is operatively coupled to the module $G_2$.

The input ports 760 can be any ports suitable to receive data packets from a module $F_1$-$F_N$ associated with the first stage 632 of the switch fabric 630. Accordingly, the input ports 760 can operatively couple the module $G_2$ with the modules $F_1$-$F_N$ associated with the first stage 632 via the data paths between the modules $F_1$-$F_N$ and the module $G_2$ (see FIG. 6). Similarly, the output ports 770 can be any ports suitable to send data packets to a module $H_1$-$H_N$ associated with the third stage 636 of the switch fabric 630. Accordingly, the output ports 770 can operatively couple the module $G_2$ with the modules $H_1$-$H_N$ associated with the third stage via the data paths between the modules $H_1$-$H_N$ and the module $G_2$ (see FIG. 6).

In some embodiments, the module $G_2$ includes an output queue 720 for each output port 770. Accordingly, as described in further detail herein, the packet processor 750 can store data packets to be sent on a given output port 770 in its respective output queue 720. As such, the output queues 720 can be configured to buffer data packets received at the module $G_2$ via the input ports 760. The output queues 720 can be any suitable output queues. In some embodiments, for example, the output queues 720 operate as first-in first-out (FIFO) buffers. In such embodiments, the data packets are sent via the output ports 770 in the order received from the packet processor 750. In other embodiments, data packets can be assigned a priority level, with those data packets with a high priority level being moved to the front of the output queues 720. In still other embodiments, the output queues 720 can be structured and/or divided into multiple priority-based queues.

In some embodiments, the output queues 720 can be part of a shared memory buffer (not shown in FIG. 7) implemented using on-chip static random access memory (SRAM) to provide sufficient bandwidth for the packet processor 750 to write one incoming cell (e.g., a portion of a data packet) or data packet per input port 760 per time period (e.g., one or more clock cycles), and all output ports 770 to read one outgoing cell or data packet per time period. The shared memory buffer can be partitioned to include the output queues 720. As mentioned above, each output port 770 can be associated with an output queue 720. As such, the data packets to be sent via an output port 770 are stored and/or buffered in the output queue 720 associated with that output port 770.

In some embodiments, the size of each output queue 720 can be dynamic and/or variable. As such, based on the number of data packets to be sent via an output port 770, the output queue 720 associated with that output port 770 can expand or contract. For example, if, at a first time, the output port 770 associated with O Queue 1 has a greater number of data packets and/or cells buffered to be sent than the output port 770 associated with O Queue 2, the size of O Queue 1 can be adjusted to be greater than the size of O Queue 2. Similarly, if, at a second time, the output port 770 associated with O Queue 2 has a greater number of data packets and/or cells buffered to be sent than the output port 770 associated with O Queue 1, the size of O Queue 2 can be adjusted to be greater than the size of O Queue 1. Accordingly, the shared memory buffer can be dynamically allocated based on the needs and/or requirements of the various output queues 720.

In some embodiments, each output queue 720 can have a maximum size. This ensures that a single output queue 720 does not use a large or unfair portion of the shared memory at the expense of another output queue 720 that also uses the shared memory. In some embodiments, each output queue 720 can also have a minimum size. Such a minimum size ensures that each output queue 720 can always handle at least a small number of data packets.

The packet processor 750 can be any suitable processor (or processor module or software module operating on a processor) configured to receive and/or read data packets from the input ports 760, process the data packets, and send the data packets to and/or store the data packets in the output queues 720. For example, the packet processor 750 can receive a data packet received via an input port 760 operatively coupling the module $G_2$ with the modules $F_1$-$F_N$ associated with the first stage 632. Such a data packet can include a source ID and a destination ID, and can be similar to the data packet 400 of FIG. 5. Additionally, in some embodiments, for example, the data packet can include at least a portion of an IP 5-tuple. In such embodiments, for example, the header can include a destination MAC address, a destination IP address, a source MAC address, a source IP address and/or a transfer protocol. In other embodiments, the header can include any other identifying information associated with the data packet, such as, for example, a priority indicator.

The packet processor 750 can use the information within the header to assign the data packet to an output queue 720 associated with a data path operatively coupling the module $G_2$ and a module $H_1$-$H_N$ associated with the third stage 636. For example, the packet processor 750 can assign the data packet to an output queue 720 randomly, based on the available capacity of each output queue 720, based on the results of a hash function, based on a look-up table, based on an indication from a central controller (not shown in FIGS. 6 and 7) and/or using any other method. Such a hash function and/or look-up table can use as an input a header value such as, for example, a destination MAC address, a destination IP address, a source MAC address, a source IP address, a priority indicator, a transfer protocol and/or any other suitable value. In some embodiments, for example, a look-up table and/or a hash function can associate each output queue 720 with a range of IP and/or MAC addresses. As will be described in more detail herein, when packet processor 750 assigns the data packet to a queue based on the look-up path, other data packets having at least some of the same header information can be assigned to the same output queue, independent of the available capacity of the output queue. By way of example, when a series of data packets are sent from source S1 to destination S5, each of data packets in the series are routed from module F1 through module G2 to module H2.

The capacity module 730 can be structurally and functionally similar to the capacity module 330 shown and described with respect to FIG. 3. As such, the capacity module 730 can be any suitable hardware module and/or software module (executing in hardware) configured to monitor an available capacity of the output queues 720. In some embodiments, for example, the capacity module 730 can include a field-programmable gate array (FPGA), an application specific integrated circuit (ASIC), a digital signal processor (DSP) and/or the like. In some embodiments, the capacity module 730 can include a processor and a memory storing program code to be executed by the processor.

In some embodiments, capacity module 730 monitors the available capacity of all the modules in the switch fabric. By way of example in switch fabric 600, capacity module monitors the available capacity of modules $F_1$-$F_N$ associated with a first stage 632 of the switch fabric 630, modules $G_1$-$G_N$ associated with a second stage 634 of the switch fabric 630, and modules $H_1$-$H_N$ associated with a third stage 636 of the switch fabric 630. In some embodiments, the modules of the switch fabric can request the available capacity of another module(s) of the switch fabric to determine a load-based path for a data packet. In some embodiments, the modules of the switch fabric can receive the available capacity of another module(s) of the switch fabric system according to a schedule, e.g. every 0.1 s, to determine a load-based path for the data packet.

Returning to FIG. 6, the peripheral processing devices 670 can be, for example, compute nodes, service nodes, routers, and storage nodes, as described in further detail herein. In some embodiments, for example, the peripheral processing devices 670 include servers, storage devices, gateways, workstations, and/or the like. The peripheral processing devices 670 can be operatively coupled to the edge devices 650 using any suitable connection such as, for example, an optical connection (e.g., an optical cable and optical connectors), an electrical connection (e.g., an electrical cable and electrical connectors) and/or the like. As such, the peripheral processing devices 670 are configured to send data (e.g., data packets, data cells, etc.) to the edge devices 650. Any peripheral processing device 670 operatively coupled to the switch fabric 630 via an edge device 650 can send a data packet to any other peripheral processing device 670 coupled to the switch fabric 630 via an edge device 650. In use, for example, a peripheral processing device $S_1$ can send a data packet to another peripheral processing device $S_5$. FIG. 6 represents the peripheral processing device $S_1$ sending a data packet to peripheral processing device $S_5$ by way of example.

The edge devices 650 can be any devices configured to operatively couple peripheral processing devices 670 to the switch fabric 630. In some embodiments, for example, the edge devices 650 can be access switches, input/output modules, top-of-rack devices and/or the like. Edge devices $E_1$ and $E_2$ are schematically shown as source edge devices and edge device $E_3$ is schematically shown as a destination edge device for illustration purposes only. Structurally, the edge devices 650 (including $E_1$, $E_2$, and $E_3$) can function as source edge devices and destination edge devices. Accordingly, the edge devices 650 can send data to and receive data from the switch fabric 630.

While shown in FIG. 6 as being operatively coupled to a single module $F_1$ associated with the first stage 632, the edge device $E_1$ can be coupled to additional modules associated with the first stage 632. Additionally, while shown in FIG. 6 as being operatively coupled to a single switch fabric 630, the edge device $E_1$ can be operatively coupled to additional switch fabrics, similar to switch fabric 630. In some embodiments, for example, the edge device $E_1$ can be coupled to the module $F_1$ associated with the first stage of the switch fabric 630 and a module associated with a first stage of a second switch fabric (not shown in FIG. 6). In such embodiments, the edge device $E_1$ can send data to either the module $F_1$ or the module associated with the first stage of the second switch fabric.

In some embodiments, the edge devices 650 can be configured to prepare a data packet to enter the switch fabric 630. For example, the edge devices 650 can be configured to forward, classify, and/or modify the packet encapsulation of a data packet prior to sending the data packet to the switch fabric 630. In some embodiments, for example, the edge devices 650 can append a source identifier (e.g., source MAC address, IP address, etc.), a destination identifier (e.g., source MAC address, IP address, etc.) and/or any other information to the data packet. Such information can be used to route the data packet through the switch fabric 630.

The peripheral processing device $S_1$ can send the data packet to the edge device $E_1$. In some embodiments, the data packet can include a payload and a header. The payload can include data to be sent to peripheral processing device $S_5$. The header can include identifying information. In some embodiments, for example, the header can include at least a portion of an IP 5-tuple associated with the source and destination peripheral processing devices 670. In such embodiments, for example, the header can include a destination peripheral processing device MAC address, a destination peripheral processing device internet protocol (IP) address, a source peripheral processing device MAC address, a source peripheral processing device IP address and/or a transfer protocol identifier. In the present example, the destination peripheral processing device MAC address and the destination peripheral processing device IP address can be associated with peripheral processing device $S_5$, and the source peripheral processing device MAC address and the source peripheral processing device IP address can be associated with peripheral processing device $S_1$. In some embodiments, the edge device $E_1$ can also append a source edge device identifier (e.g., a MAC and/or IP address associated with $E_1$) and a destination edge device identifier (e.g., a MAC and/or IP address associated with $E_3$). Such information can be used in conjunction with a lookup table to route the data packet through the switch fabric 630 as shown and described in U.S. patent application Ser. No. 12/607,162, filed on Nov. 18, 2009, entitled "Methods and Apparatus Related to a Distributed Switch Fabric," which is incorporated herein by reference in its entirety. Using such source and destination specific information in conjunction with a lookup table to route data packets through the switch fabric 630 can ensure that each data packet originating from a particular source to be sent to a particular destination will be sent through the switch fabric 630 via the same path (e.g., through the same modules associated with each stage of the switch fabric 630). Similarly stated, the order of data packets sent through the switch fabric 630 from a first edge device 650 to a second edge device 650 is maintained.

Using the information contained within the header of the data packet, the edge device $E_1$ can determine to which module $F_1$-$F_N$ to send the data packet. In some embodiments, for example, the edge device $E_1$ can use a hash function using as inputs the destination peripheral processing device MAC address, the destination peripheral processing device IP address, the source peripheral processing device MAC address, the source peripheral processing device IP address, the destination edge device identifier, the source edge device identifier and/or the transfer protocol identifier to determine to which module $F_1$-$F_N$ to send the data packet.

After the module $F_1$ associated with the first stage 632 receives the data packet, the module $F_1$ determines to send the data packet to the module $G_2$ associated with the second stage 634. In some embodiments, for example, the module $F_1$ can use a hash function using as an input a destination identifier and/or a source identifier. Based on the inputs to the hash function, the module $F_1$ can forward the data packet to the module $G_2$ associated with the second stage 634. The module $G_2$ can similarly forward the data packet to the module $H_2$ associated with the third stage 636. Using the destination edge device identifier, the module $H_2$ can forward the data packet to the destination edge device $E_3$. Using the destination peripheral processing device identifier, the edge device $E_3$ can then forward the data packet to the destination peripheral processing device $S_5$.

As discussed above, if congestion occurs at a module $F_1$-$F_N$, $G_1$-$G_N$, $H_1$-$H_N$ within the switch fabric 630, the edge devices and modules $F_1$-$F_N$, $G_1$-$G_N$, $H_1$-$H_N$ can request and/or receive an indication of the available capacities of the remaining modules $F_1$-$F_N$, $G_1$-$G_N$, $H_1$-$H_N$ and can make a route decision, e.g., route a data packet around a congested module, or around a congested queue of a module. This reduces the number of data packets received at the congested queue, thus over time reducing the congestion and increasing the available capacity at the queue.

Route decisions can be made at certain points in a switch fabric system. Various attributes of a switch fabric system affect where a route decision can be made, such as, for example, the number of stages, how many first stage modules a source device is operatively coupled with, and/or how many last stage modules to which an destination device is operatively coupled. By way of example, in switch fabric 600, because $S_1$ is operatively coupled with first stage 632 module $F_1$ via $E_1$, any data packet entering switch fabric 600 from $S_1$ will enter via module $F_1$. Similarly, because $S_5$ is operatively coupled with third stage 636 module $H_2$ via $E_3$, any data packet leaving switch fabric 600 to $S_5$ will exit via module $H_2$. Therefore, a route decision for a data packet being sent to $S_5$ from $S_1$ can be made at first stage 632.

In some embodiments, a source device (e.g., peripheral processor device $S_1$) can be operatively coupled to more than one edge device and can make a route decision. Similarly, in some embodiments, a destination device can be operatively coupled to more than one edge device and a last stage module can make a route decision. In some embodiments, an edge device can be operatively coupled to more than one first stage module and can make a route decision. Similarly, in some embodiments, an edge device can be operatively coupled to more than one last stage module and a middle stage module, e.g. any stage other than the first or last, can make a route decision. In some embodiments, a switch fabric system can be more than three stages and can allow a route decision to be made within a middle stage module (e.g., the second stage of a five stage switch).

Figure 8:
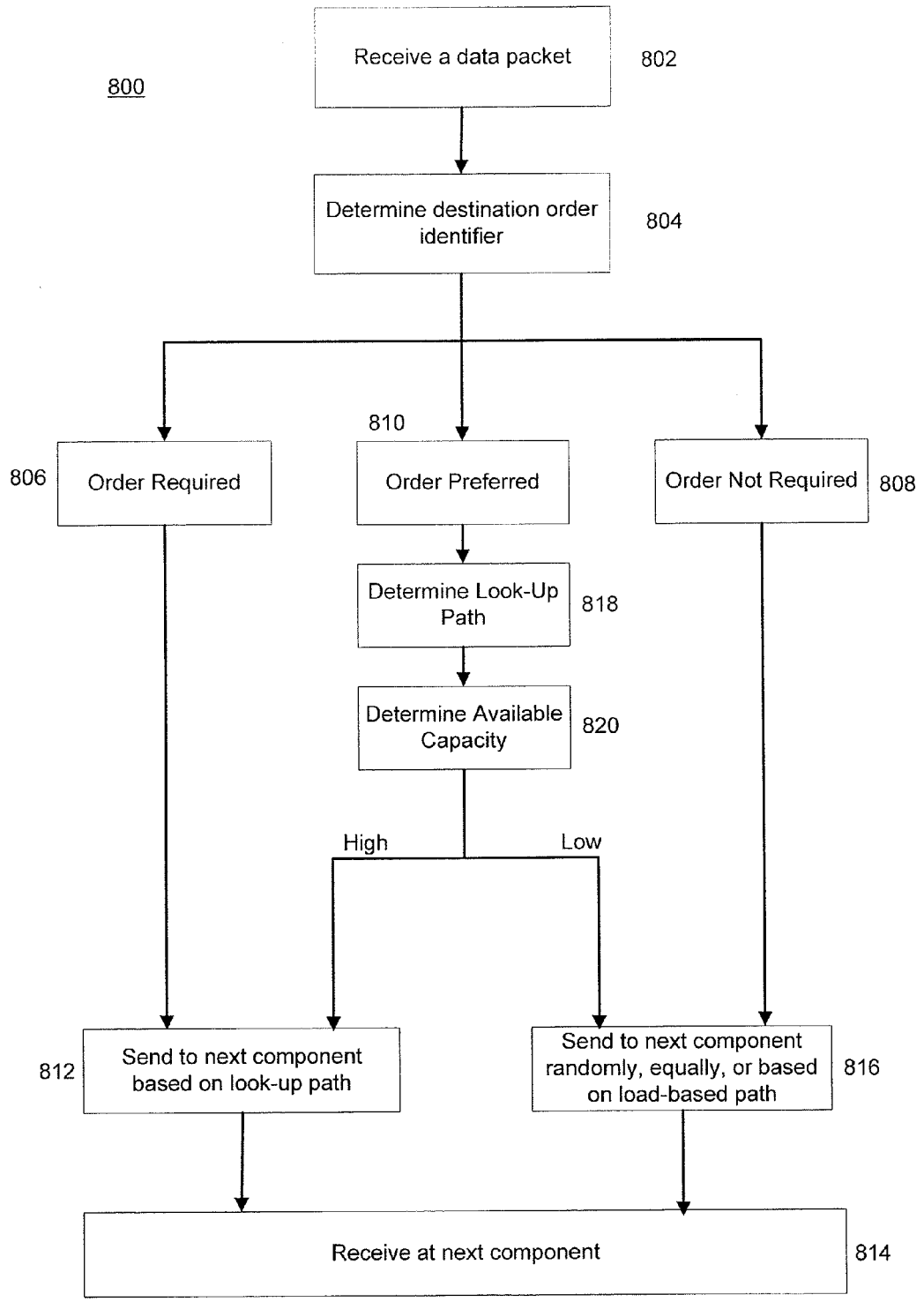
FIG. 8 is a flow chart illustrating a method of sending a capacity signal, according to another embodiment.
Figure 9:
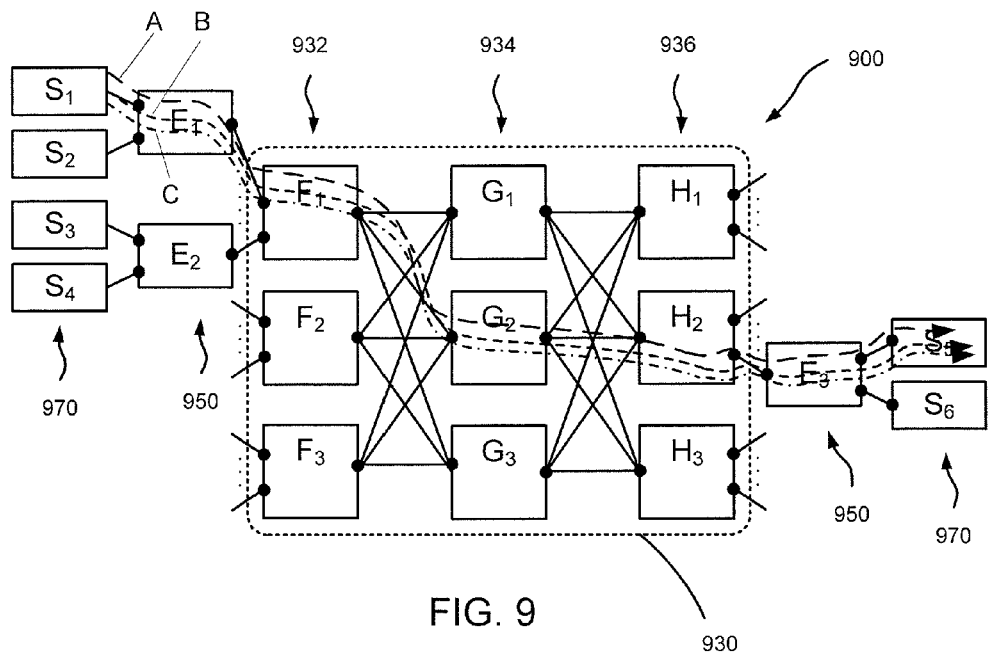
FIG. 9 is a system block diagram of a portion of a switch fabric system, according to another embodiment.
Figure 10:
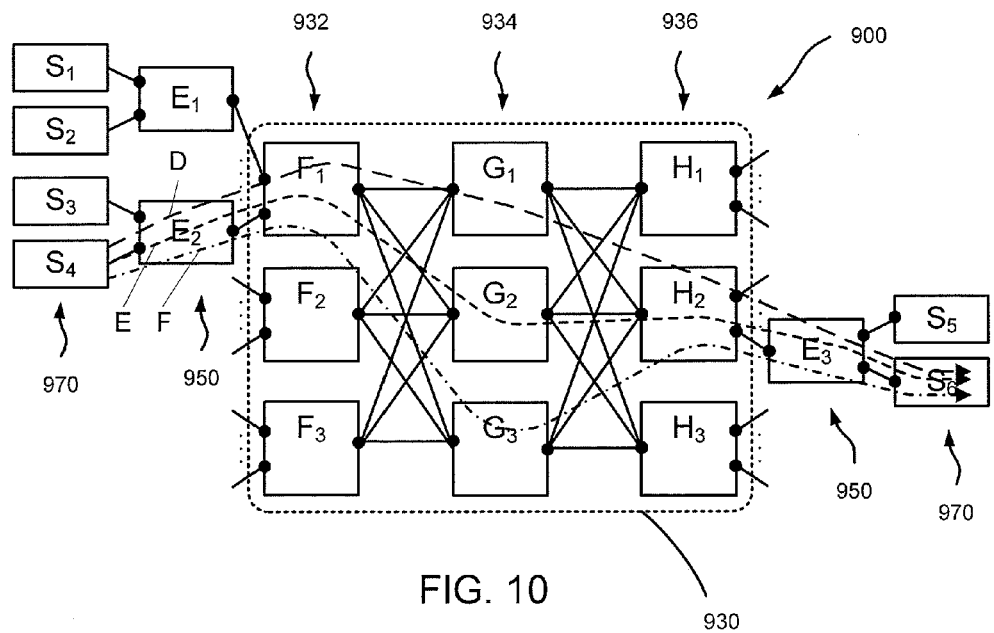
FIG. 10 is a system block diagram of a portion of a switch fabric system, according to another embodiment.

FIG. 8 is a flow chart illustrating a method 800 of operating a switch fabric system according to an embodiment. FIGS. 9 and 10 are schematic illustrations of a switch fabric system 900 using method 800. Switch fabric system 900 shown in FIGS. 9 and 10 can be similar to and have similar components to switch fabric system 600 shown in FIG. 6.

A switch fabric system component, such as for example, a source device, edge device, or switch fabric module, can receive a data packet at a route decision point, at 802. The switch fabric system component can parse the data packet and can classify the data packet based on the destination device, at 804. The destination device, and relatedly the data packet, can be categorized as a device that can only accept in-order packet delivery (assigned path), at 806; as a device that prefers in-order packet delivery (flexible path), at 810, or as a device that can accept out-of-order packet delivery (unassigned path), at 808.

The destination device, and relatedly the data packet path, can be categorized as assigned (see 806). When a destination device is categorized as assigned, it can only receive data packets in the order they are sent. Said another way, if a source device sends a destination device a set of data packets including a first data packet, a second data packet, and a third data packet, the source device sends the first data packet at a first time, the second data packet at a second time after the first time, and the third data packet at a third time after the second time. The destination device receives the first data packet first, the second data packet second, and the third data packet third. In this manner, the destination device can properly process the data in the original order. When the destination device is assigned, switch fabric system components can send the data packet to the next switch fabric system component based on the look-up path, at 812. The look-up path can be the same look-up path for any packet having the given source/destination combination. In this manner, each data packet will arrive at the destination in the order it was sent from the source, at 814.

The destination device, and relatedly the data packet path, can be categorized as unassigned (see 808). When the destination device is unassigned, it can receive data packets in any order. Said another way, if a source device sends a destination device a set of data including a first data packet, a second data packet, and a third data packet, the source device sends the first data packet at a first time, the second data packet at a second time after the first time, and the third data packet at a third time after the second time. The destination device can receive the first data packet, the second data packet, and the third data packet in any order. Because the destination device can receive the data packets out-of-order, the destination device can rearrange the data packets into the proper order. When the destination device is unassigned, switch fabric system components can randomly send each data packet along different paths, can equally distribute the data packets among more than one path, and/or can send each data packet along a load-based path based on the available capacity of other switch fabric system components along a given path, at 816. In some embodiments, a capacity module can monitor the available capacity of the switch fabric system components and can send an indication of available capacity of any of the switch fabric system components to any other of the switch fabric system components. In this manner, the switch fabric system component receiving the data packet can determine the path based on the available capacity of other switch fabric system components, e.g., send a data packet around a switch fabric system component with low available capacity. Specifically, the system component that receives the data packet can determine the available capacity of different paths, e.g., the available capacity of different second stage modules within a switch fabric, and can send the data packet along the path with the highest available capacity.

The destination device, and subsequently the data packet path, can be categorized as flexible (see 810). When the destination device is flexible, it can receive data packets in the order they are sent if a first condition is met (e.g., capacity of a buffer is above a threshold), or can receive data packets in any order if a second condition is met (e.g., capacity of a buffer is below a threshold). Specifically, the switch fabric system component can determine a look-up path the data packet can take, at 818. The switch fabric system component can then request an indication of the available capacity of any other switch fabric system component along the look-up path, at 820, and can determine if the available capacity is above a first threshold (high capacity), and can send the data packet along the look-up path to the destination device, at 812. In some embodiments, the switch fabric system component can then request an indication of the available capacity of any other system component along the look-up path, at 820, and can determine if the available capacity is below the first threshold (low capacity), and can randomly send each data packet along different paths, can equally distribute the data packets among more than one path, and/or can send each data packet along a load-based path based on the available capacity of other switch fabric system components along a given path, at 816. Said another way, when the available capacity of the initial path is above the first threshold, the system component treats a flexible data packet similar to an assigned data packet, and when the available capacity of a look-up path is below the first threshold, the system component treats a flexible data packet similar to an unassigned data packet.

FIG. 9 is an schematic illustration of a switch fabric system 900 using method 800 of an embodiment. Switch fabric system 900 can be similar to and include similar components as switch fabric system 600 shown in FIG. 6. Switch fabric 930 can include three stages and each stage can include 3 modules. FIG. 9 depicts the paths of three data packets, A, B, C being sent from source device $S_1$ to destination $S_5$. In this first example, destination $S_5$ can be an assigned-path destination and data packets sent to destination $S_5$ have assigned data paths. As shown in FIG. 9, source device $S_1$ is operatively coupled with switch fabric 930 via edge device $E_1$ and first-stage module $F_1$. In this manner, data packets sent from source device $S_1$ to any destination device are sent from source device $S_1$ to edge device $E_1$, and from edge device $E_1$ to first-stage module $F_1$. Because first-stage module $F_1$ can send a data packet to second-stage module $G_1$, second-stage module $G_2$, or second-stage module $G_3$, first stage 932 of switch fabric 930 is a path decision point, and first-stage module $F_1$ can perform method 800. In this first example, first-stage module $F_1$ can receive first packet A, can parse first packet A, and determine that the destination is destination device $S_5$ and that destination device $S_5$ requires in-order delivery. First-stage module $F_1$ can reference a look-up table and determine that data packet A should be sent to second-stage module $G_2$. Because second-stage module $G_2$ must send data packet A to third-stage module $H_2$, the second stage is not a path decision point, and second-stage module $G_2$ does not perform method 800. Second-stage module $G_2$ can then reference a look-up table and determine that data packet A should be sent to third-stage module $H_2$. Third-stage module $H_2$ can similarly determine that data packet A should be sent to edge device $E_3$, and edge device $E_3$ can similarly determine that data packet A should be sent to destination device $S_5$. Destination device $S_5$ can receive data packet A.

As described earlier, the look-up tables can be set up in such a way that all data packets from a first source device to a first destination device can travel along the same path to insure sequential delivery. Therefore, because destination device $S_5$ requires in-order delivery, when source device $S_1$ sends data packet B, edge device $E_1$, first-stage module $F_1$, second-stage module $G_2$, third-stage module $H_2$, and edge device $E_3$ will perform the similar steps on data packet B as on data packet A, and will result in the same path. Similarly, when source device $S_1$ sends data packet C, edge device $E_1$, first-stage module $F_1$, second-stage module $G_2$, third-stage module $H_2$, and edge device $E_3$ will perform the similar steps on data packet C as on data packet A and data packet B, and will result in the same path.

FIG. 10 is an schematic illustration of a switch fabric system 900 using method 800 in another example. FIG. 10 depicts the paths of three data packets, D, E, F being sent from source device $S_4$ to destination device $S_6$. In this second example, destination device $S_6$ can be a destination that can process data packets received out-of-order and therefore data packets sent to destination device $S_6$ have unassigned data paths. As shown in FIG. 10, source device $S_4$ is operatively coupled with switch fabric 930 via edge device $E_2$ and first-stage module $F_1$. In this manner, data packets sent from source device $S_4$ to any destination device are sent from source device $S_4$ to edge device $E_2$, and from edge device $E_2$ to first-stage module $F_1$. Because first-stage module $F_1$ can send a data packet to second-stage module $G_1$, second-stage module $G_2$, or second-stage module $G_3$, first stage 932 of switch fabric 930 is a path decision point, and first-stage module $F_1$ can perform method 800. In this second example, first-stage module $F_1$ can receive first packet D, can parse first packet D, and determine that the destination is destination device $S_6$ and that destination device $S_6$ can receive packets in any order. First-stage module $F_1$ can send a request to a capacity module to determine the available capacity of each of second-stage modules $G_1$, $G_2$, $G_3$. In some embodiments, first-stage module $F_1$ receives the available capacity of each of modules second-stage $G_1$, $G_2$, $G_3$ periodically, e.g., every 0.1 seconds. First-stage module $F_1$ can send data packet D to the second-stage module $G_1$, $G_2$, $G_3$ with the greatest capacity. In some embodiments, first-stage module F1 can randomly (or via round robin) send first data packet D to one of second-stage modules $G_1$, $G_2$, $G_3$. In this second example, second-stage module $G_1$ can initially have the highest capacity, and first-stage module $F_1$ can forward data packet D to second-stage module $G_1$.

Because second-stage module $G_1$ sends data packet D to module $H_2$, the second stage is not a path decision point, and second-stage module $G_1$ does not perform method 800. Second-stage module $G_1$ can then reference a look-up table and determine that data packet D should be sent to third-stage module $H_2$. Third-stage module $H_2$ can similarly determine that data packet D should be sent to edge device $E_3$, and edge device $E_3$ can similarly determine that data packet D should be sent to destination device $S_6$. Destination device $S_6$ can receive data packet D before or after destination device $S_6$ receives data packet E and/or data packet F.

Referencing and expanding the second example, first-stage module $F_1$ can receive second packet E, can parse second packet E, and determine that the destination is destination device $S_6$ and that destination device $S_6$ can receive packets in any order. First-stage module $F_1$ can send a request to a capacity module to determine the available capacity of each of second-stage modules $G_1$, $G_2$, $G_3$. In some embodiments, first-stage module F1 receives the available capacity of each of second-stage modules $G_1$, $G_2$, $G_3$ periodically, e.g., every 0.1 seconds. First stage module $F_1$ can send second data packet E to the second-stage module $G_1$, $G_2$, $G_3$ with the greatest capacity. In some embodiments, first-stage module $F_1$ can randomly (or via round robin) send second data packet E to one of second-stage modules $G_1$, $G_2$, $G_3$. In the second example, second-stage module $G_2$ can now have the highest capacity, and first-stage module F1 can forward second data packet E to second-stage module $G_2$. Because second-stage module $G_2$ sends second data packet E to third-stage module $H_2$, the second stage is not a path decision point, and second-stage module $G_2$ does not perform method 800. Second-stage module $G_2$ can then reference a look-up table and determine that second data packet E should be sent to third-stage module $H_2$. Third-stage module $H_2$ can similarly determine that second data packet E should be sent to edge device $E_3$, and edge device $E_3$ can similarly determine that second data packet E should be sent to destination device $S_6$. Destination device $S_6$ can receive data packet E before or after destination device $S_6$ receives first data packet D and/or data packet F.

Further referencing and expanding the second example, first-stage module $F_1$ can receive third packet F, can parse third data packet E, and determine that the destination is destination device $S_6$ and that destination device $S_6$ can receive packets in any order. First-stage module $F_1$ can send a request to a capacity module to determine the available capacity of each of second-stage modules $G_1$, $G_2$, $G_3$. In some embodiments, first-stage module $F_1$ receives the available capacity of each of second-stage modules $G_1$, $G_2$, $G_3$ periodically, e.g., every 0.1 seconds. First-stage module $F_1$ can send third data packet F to the second-stage module $G_1$, $G_2$, $G_3$ with the greatest capacity. In some embodiments, first-stage module $F_1$ can randomly (or via round robin) send third data packet F to one of second-stage modules $G_1$, $G_2$, $G_3$. In the second example, second-stage module $G_3$ can now have the highest capacity, and first-stage module $F_1$ can forward third data packet F to second-stage module $G_3$. Because second-stage module G3 sends third data packet F to third-stage module $H_2$, the second stage is not a path decision point, and second-stage module $G_3$ does not perform method 800. Second-stage module G3 can then reference a look-up table and determine that third data packet F should be sent to third-stage module $H_2$. Third-stage module $H_2$ can similarly determine that third data packet F should be sent to edge device $E_3$, and edge device $E_3$ can similarly determine that third data packet F should be sent to destination device $S_6$. Destination device $S_6$ can receive data packet F before or after destination device $S_6$ receives first data packet D and/or second data packet E.

While FIGS. 9 and 10 show first-stage modules $F_1$, $F_2$, $F_3$ performing method 800, any switch fabric system component can perform method 800. By way of example, in an alternative arrangement, edge device $E_1$ can also be operatively coupled to first-stage module $F_2$ and can send data packets to either first-stage module $F_1$ or first-stage module $F_2$ based on the available capacity of first-stage module $F_1$, the available capacity of first-stage module $F_2$, and whether the data packet path is assigned, flexible, or unassigned based on the data packet destination device. In some embodiments, switch fabric system 900 can include destination devices that are assigned, flexible, unassigned, or any combination of assigned, flexible, and/or unassigned. As described above, data packets sent to a destination device that are flexible can be treated as assigned when the available capacity of a system component along the look-up path is above a threshold, and can be treated as unassigned when the available capacity of a system component along the look-up path is below a threshold. In some embodiments when data including more than one data packet is sent from a first source device to a first destination device that is flexible, at least one of the data packets is treated as assigned and at least one of the data packets is treated as unassigned. In some embodiments when data including more than one data packet is sent from a first source device to a first destination device that is flexible, at least one of the data packets is treated as assigned at a first time and the at least one of the data packets is treated as unassigned at a second time different from the first time.

While various embodiments have been described above, it should be understood that they have been presented by way of example only, and not limitation. Where methods described above indicate certain events occurring in certain order, the ordering of certain events can be modified. Additionally, certain of the events can be performed concurrently in a parallel process when possible, as well as performed sequentially as described above.

While shown and described above as the capacity module monitoring an available capacity of an output queue, in other embodiments, the switch module (e.g., switch 320) monitors the available capacity of the output queue and automatically sends an indication of available capacity to connected system components when the available capacity of the output queue is less than a threshold.

While shown and described above as being a three-stage switch fabric, in other embodiments, the switch fabric can include any number of stages. In some embodiments, for example, the switch fabric can be a five stage switch fabric similar to the switch fabric shown and described in co-pending U.S. patent application Ser. No. 12/345,500, filed on Dec. 29, 2008, and entitled System Architecture for a Scalable and Distributed Multi-Stage Switch Fabric," and co-pending U.S. patent application Ser. No. 12/345,502, filed on Dec. 29, 2008, and entitled "Methods and Apparatus Related to a Modular Switch Architecture," each of which is incorporated herein by reference in its entirety. The switch fabric 102 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety. The switch fabric 102 can be, for example, part of a switch core portion of a data center similar to the switch core portion of the data center described in co-pending U.S. patent application Ser. No. 12/558,130, filed Sep. 11, 2009, and entitled "Methods and Apparatus Related to a Low Cost Data Center Architecture," which is incorporated herein by reference in its entirety.

While shown and described above as routing, switching and/or forwarding a data packet through a switch fabric (e.g., switch fabric 200 of FIG. 2), in some embodiments edge devices are configured to partition data packets into one or more data cells. In such embodiments, the data cells include a header (e.g., with a destination edge device identifier and a source edge device identifier) and can be routed, switched and/or forwarded through a switch fabric similar to that described herein with respect to data packets. A destination edge device can receive and reassemble the data cells to define the data packet. The data packet can then be sent to a destination peripheral processing device. In some embodiments, such data cells do not take a common path through the switch fabric. For example, some data cells defined from a data packet might pass through a first module associated with a second stage of the switch fabric while other data cells defined from the same data packet might pass through a second module associated with the second stage of the switch fabric. Moreover, in some embodiments, the data cells are equal in length and/or size.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured to perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details can be made. Any portion of the apparatus and/or methods described herein can be combined in any combination, except mutually exclusive combinations. The embodiments described herein can include various combinations and/or sub-combinations of the functions, components and/or features of the different embodiments described.

What is claimed is:

1. An apparatus, comprising:
a switch module configured to receive an order identifier of a first data packet from a first stage of a multi-stage switch;
the switch module configured to receive an indicator of an available capacity of a first module of a second stage of the multi-stage switch fabric, and an indicator of an available capacity of a second module of the second stage of the multi-stage switch fabric;
the switch module configured, when the order identifier is assigned, to direct the first data packet to the first module when the available capacity of the second module is higher than the available capacity of the first module;
the switch module configured, when the order identifier is unassigned, to direct the first data packet to the second module when the available capacity of the second module is higher than the available capacity of the first module;
the switch module is configured, when the order identifier is flexible, to direct the first data packet to the second module when the available capacity of the first module is below a threshold;

the switch module is configured, when the order identifier is flexible, to direct the first data packet to the first module when the available capacity of the first module is above a threshold.

2. The apparatus of claim 1, wherein:
the switch module is configured, when the order identifier is unassigned, to direct the first data packet to the first module when the available capacity of the second module is lower than the available capacity of the first module.

3. The apparatus of claim 1, wherein:
the switch module is configured, when the order identifier is unassigned, to direct the first data packet to the first module when the available capacity of the first module is higher than the available capacity of the second module.

4. The apparatus of claim 1, wherein:
the switch module is configured to receive an destination identifier of the first data packet, the order identifier of the first data packer is based on the destination identifier.

5. The apparatus of claim 1, wherein:
the switch module is configured, when the order identifier is unassigned, to direct the first data packet to the first module or to the second module when the available capacity of the second module is lower than the available capacity of the first module.

6. An apparatus, comprising:
a switch module configured to receive an destination identifier of a first data packet from a first stage of a multi-stage switch;
the switch module configured to send a request for an order identifier based on the destination identifier;
the switch module configured to request, when the order identifier is unassigned, an indicator of an available capacity of a first module of a second stage of the multi-stage switch fabric, and an indicator of an available capacity of a second module of the second stage of the multi-stage switch fabric;
the switch module configured, when the order identifier is unassigned, to direct the first data packet to the first module when the available capacity of the first module is higher than the available capacity of the second module;
the switch module configured, when the order identifier is assigned, to direct the first data packet to the first module when the available capacity of the first module is lower than the available capacity of the second module;
the switch module is configured to direct, when the order identifier is flexible, the first data packet to the first module when an available capacity of the first module is above a first threshold;
the switch module is configured to direct, when the order identifier is flexible, the first data packet to the second module when an available capacity of the first module is below a first threshold.

7. The apparatus of claim 6, wherein:
the switch module configured, when the order identifier is unassigned, to direct the first data packet to the second module when the available capacity of the second module is higher than the available capacity of the first module.

8. The apparatus of claim 6, wherein the order identifier is assigned when a destination of the first data packet is configured to receive a plurality of data packets in chronological order.

9. The apparatus of claim 6, wherein the order identifier is unassigned when the first data packet does not have a specified order relative to other data packets.

10. A non-transitory processor-readable medium storing code representing instructions to cause a processor to:
receive an order identifier of a first data packet from a multi-stage switch;
direct, when the order identifier is unassigned, the first data packet to any module from a plurality of modules of a second stage of the multi-stage switch;
direct, when the order identifier is assigned, the first data packet to a first module from the plurality of modules of a second stage of the multi-stage switch when the available capacity of a second module of a second stage of the multi-stage switch is higher than the available capacity of the first module;
direct, when the order identifier is flexible, the first data packet to the first module when an available capacity of the first module is above a first threshold; and
direct, when the order identifier is flexible, the first data packet to the second module when an available capacity of the first module is below a first threshold.

11. The non-transitory processor-readable medium of claim 10, further storing code representing instructions to cause a processor to:
receive an indicator of an available capacity of the first module, and an indicator of an available capacity of the second module;
direct, when the order identifier is unassigned, the first data packet to the first module when the available capacity of the second module is lower than the available capacity of the first module; and
direct, when the order identifier is unassigned, the first data packet to the second module when the available capacity of the second module is higher than the available capacity of the first module.

12. The non-transitory processor-readable medium of claim 10, further comprising code representing instructions to cause a processor to:
receive an order identifier of a second data packet from the multi-stage switch;
receive an indicator of an available capacity of the first module, and an indicator of an available capacity of a second module from the plurality of modules of the second stage of the multi-stage switch fabric;
direct, when the order identifier of the second data packet is unassigned, the second data packet to the first module when the available capacity of the second module is lower than the available capacity of the first module; and
direct, when the order identifier of the second data packet is unassigned, the second data packet to the second module when the available capacity of the second module is higher than the available capacity of the first module.

13. The non-transitory processor-readable medium of claim 10, wherein the order identifier is unassigned when the first data packet does not have a specified order relative to other data packets.

14. The non-transitory processor-readable medium of claim 10, wherein the order identifier is assigned when a destination of the first data packet is configured to receive a plurality of data packets in chronological order.

15. The non-transitory processor-readable medium of claim 10, wherein the order identifier is based on an indication of destination of the first packet.

* * * * *